though it may be resorted to if desired. Completion of the hydrolysis is conveniently determined by paper chromatography, employing a suitable solvent system for separation and development, such as n-butanol-acetic acid-water (12:3:5). After complete conversion of the N-acetyl-L- compound, the mixture is acidified and filtered, if necessary, to remove any solids, such as denatured enzyme. The filtrate is concentrated under reduced pressure to a small volume, and the 3-(3,4-dimethoxyphenyl)-L-alanine is precipitated by adjustment of the pH to about 5-6 by addition of a base such as ammonium hydroxide. The product is collected by filtration, and is of sufficiently high purity to be used for conversion to 3-(3,4-dihydroxyphenyl)-L-alanine without further purification. It may, however, be further purified by crystallization from water if desired. The starting material for the foregoing process, N-acetyl-3-(3,4-dimethoxyphenyl)-DL-alanine, can be conveniently prepared by the procedure of Yamada et al., *Chem. Pharm. Bull.* (Tokyo), 10, 693 (1962), in which 3,4-dimethoxybenzaldehyde is condensed with N-acetylglycine in the presence of acetic anhydride and sodium acetate. The resulting azlactone is converted to α-acetamido-3,4-dimethoxycinnamic acid by warming with aqueous acetone, and this compound is catalytically reduced to give N-acetyl-3-(3,4-dimethoxyphenyl)-DL-alanine.

As previously mentioned, the 3-(3,4-dimethoxyphenyl)-L-alanine obtained by the foregoing resolution procedure may be converted to 3-(3,4-dihydroxyphenyl)-L-alanine, the drug commonly known as L-dopa. Such conversion is conveniently carried out by known procedures, for example, by heating with concentrated aqueous hydrobromic acid as described by Yamada et al., loc. cit.

The invention is illustrated by the following example.

EXAMPLE

A slurry is prepared from 26.7 g. of N-acetyl-3-(3,4-dimethoxyphenyl)-DL-alanine and 300 ml. of water, and adjusted to pH 7.5 by addition of concentrated aqueous ammonia. A solution of 0.238 g. of cobaltous chloride hexahydrate in 5 ml. of water is added, followed by 1.5 g. of acylase I from *Aspergillus oryzae* (Sigma Chemical Co., activity 2,580 units/mg.). The mixture is incubated at 37° for 20 hours, at which time paper chromatography shows complete conversion of the N-acetyl-L-compound to 3-(3,4-dimethoxyphenyl)-L-alanine (solvent system: n-butanol-acetic acid-water, 12:3:5). Glacial acetic acid (15 ml.) is added, and the mixture is filtered. The filtrate is concentrated to about 100 ml. under reduced pressure, and the pH is adjusted to 5.5 by addition of concentrated aqueous ammonia. After standing overnight at 5°, the mixture is filtered, and the solids are washed with cold water and dried to give 3-(3,4-dimethoxyphenyl)-L-alanine, m.p. 275°–278° (dec.), $[\alpha]_D^{25} -6.3°$ (c, 2.0 in N hydrochloric acid).

I claim:

1. The process for producing 3-(3,4-dimethoxyphenyl)-L-alanine which comprises treating N-acetyl-3-(3,4-dimethoxyphenyl)-DL-alanine in aqueous solution at a pH of from about 6.0 to about 9.0 with an acylase from *Aspergillus oryzae* in the presence of cobaltous ions in a concentration of from about $10^{-4}$ to about $5 \times 10^{-2}$ M.

* * * * *

PROCESS FOR PRODUCING 3-(3,4-DIMETHOXYPHENYL)L-ALANINE BY RESOLUTION

SUMMARY AND DETAILED DESCRIPTION

The present invention relates to a process for producing an amino acid in optically-active form. More particularly, the invention relates to a process for the enzymatic conversion of N-acetyl-3-(3,4-dimethoxyphenyl)alanine to 3-(3,4-dimethoxyphenyl)-L-alanine.

In accordance with the invention, 3-(3,4-dimethoxyphenyl)-L-alanine of the formula

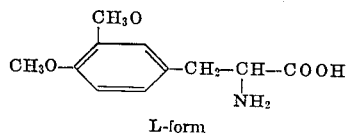

L-form is produced by subjecting N-acetyl-3-(3,4-dimethoxyphenyl)alanine of the formula

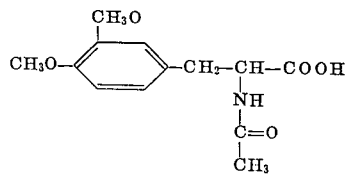

to the enzymatic action of an acylase from *Aspergillus oryzae* in an aqueous medium at a pH of 6.0 to 9.0, preferably at a pH of 6.8 to 7.5. According to a preferred optional feature of the invention, as explained below, the aqueous medium contains cobaltous ions. According to another preferred optional feature of the invention, also as explained below, the adjustment of the pH to the desired value is carried out using ammonia as a base. As indicated in the foregoing formulas, the 3-(3,4-dimethoxyphenyl)-L-alanine produced by the process of the invention has the L-form and is of the so-called natural configuration. The N-acetyl-3-(3,4-dimethoxyphenyl)alanine employed as starting material has the racemic or DL-form. The process of the invention produces 3-(3,4-dimethoxyphenyl)-L-alanine by stereo-specific deacetylation and resolution, leaving as an unreacted by-product N-acetyl-3-(3,4-dimethoxyphenyl)-D-alanine.

As indicated above, the process of the invention is most suitably carried out in an aqueous medium adjusted with ammonia to pH 6.0 to 9.0, preferably to pH 6.8 to 7.5. Under these conditions the starting material is present in part in the form of its ammonium salt and near the higher end of the pH range is present predominantly in the form of its ammonium salt. The use of ammonia as a base to achieve the desired pH value is an important preferred feature of the process of the invention in that it facilitates isolation of the product from the reaction mixture. For example, if desired, the final reaction mixture can be concentrated to a small volume for maximum recovery of the product without significant separation of insoluble inorganic salts. On the other hand, if the base used for pH adjustment were an alkali metal hydroxide in the presence of a buffer (see, for example, Chemical and Pharmaceutical Bulletin (Japan), 10, 680–688 (1962)), the separation of inorganic salts upon concentration of the final reaction mixture would complicate the isolation of the product in maximum yield.

The quantity of acylase from *Aspergillus oryzae* used in the process of the invention is not critical and can be varied over a relatively wide range. However, the quantity of acylase is important in determining the optimum time over which the reaction should be carried out. The acylase from *Aspergillus oryzae* is conveniently used in the form of a mixture of *Aspergillus oryzae* enzymes. A suitable preparation of *Aspergillus oryzae* enzymes is the product known as Taka-Diastase, produced by *Aspergillus oryzae* grown on wheat bran, or an enzymatically equivalent product. Taka-Diastase is a mixed enzyme including an amylase and an acylase. The purified acylase fraction is sometimes also known as Taka-acylase. The process of the invention is most conveniently carried out using Taka-Diastase or an enzymatically equivalent product. The reaction proceeds at a suitable rate when from 3 to 8 parts by weight of Taka-Diastase are used for each 100 parts by weight of N-acetyl-3-(3,4-dimethoxyphenyl)-alanine. However, satisfactory results are also obtained somewhat outside of this range. When using an enzyme of undetermined acylase activity, it is desirable to follow the progress of the reaction by periodic measurements of the optical rotation of the reaction mixture. The reaction is continued until the optical rotation of the reaction mixture reaches or closely approaches a constant value. In some representative experiments, the optical rotation reached a constant value (and the process was judged substantially complete) after the following reaction times using the indicated parts by weight of Taka-Diastase per 100 parts by weight of N-acetyl-3-(3,4-dimethoxyphenyl)alanine: 7.5 parts by weight, 22 hours; 6 parts by weight, 30 hours; 4.5 parts by weight, 40 hours; 3 parts by weight, 60 hours; 1.5 parts by weight, estimated 85 percent complete after 100 hours; 0.75 part by weight, estimated 55 percent complete after 100 hours.

The cobaltous ions preferably present during the process of the invention function as an activator of the acylase enzyme and cause the reaction to proceed at a more rapid rate. The cobaltous ions are suitably present in a concentration of $10^{-4}$ to $5 \times 10^{-2}$ M and are conveniently added in the form of cobaltous chloride or other cobaltous salt. Other substances can also be added to the aqueous medium as desired and it is preferred to carry out the process in the presence of 0.05 to 0.2 percent formaldehyde, which inhibits the growth of mold. The process can be carried out at a temperature from 30° to 55° C. or, if desired, somewhat outside of that range. Most commonly, the process is carried out at approximately 37° to 45° C.

The product can be isolated from the reaction mixture by any of a number of methods. Under the preferred conditions at or near pH 7, the product is relatively insoluble in the aqueous medium and can be recovered by filtration, or by concentration of the mixture and filtration. In general, the product can be isolated as an acid-addition salt under distinctly acidic conditions, as a carboxylate salt under distinctly basic conditions, or as the free amino acid under approximately neutral conditions. The free amino acid can also be converted to any desired acid-addition salt or carboxylate salt by reaction with an acid or a base.

Starting materials required for use in the foregoing process can be prepared by any of a variety of methods. In the formulas that follow, R represents a lower alkyl group of not more than six carbon atoms, preferably methyl or ethyl; and R' represents a lower alkyl group of not more than six carbon atoms, preferably methyl. For example, 3,4-dimethoxybenzaldehyde (veratraldehyde) is reacted with a malonic acid, di-(lower alkyl) ester of the formula

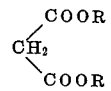

and the resulting 3,4-dimethoxybenzylidenemalonic acid, di-(lower alkyl) ester of the formula

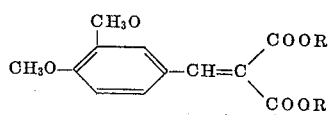

is hydrogenated in the presence of a Raney nickel catalyst to produce a 3,4-dimethoxybenzylmalonic acid, di-(lower alkyl) ester. Alternatively, 3,4-dimethoxybenzyl chloride (veratryl chloride) is reacted under anhydrous conditions in the presence of a strong base with a malonic acid, di-(lower alkyl) ester of the formula indicated above to produce a 3,4-dimethoxybenzylmalonic acid, di-(lower alkyl) ester. Suitable procedures for carrying out the above reactions are illustrated in British Pat. Specification No. 1,114,426. The 3,4-dimethoxybenzylmalonic acid, di-(lower alkyl) ester having the formula

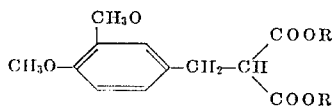

is reacted with a lower alkyl nitrite of the formula
R'—ONO
under substantially anhydrous conditions in the presence of a base to produce a 3,4-dimethoxyphenylpyruvic acid, lower alkyl ester, oxime of the formula

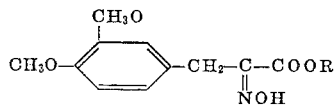

N-acetyl-3-(3,4-dimethoxyphenyl)alanine can then be produced by the sequence which comprises (a) reacting the 3,4-dimethoxyphenyl-pyruvic acid, lower alkyl ester, oxime with hydrogen and acetic anhydride in the presence of a hydrogenation catalyst, (b) reacting the resulting N-acetyl-3-(3,4-dimethoxyphenyl)alanine, lower alkyl ester, with an aqueous base at a pH of 9 to 13 whereby selective hydrolysis of the lower alkyl ester group occurs without substantial hydrolysis of the N-acetyl group, and (c) acidifying the resulting salt of N-acetyl-3-(3,4-dimethoxyphenyl)alanine whereby the said salt is converted to N-acetyl-3-(3,4-dimethoxyphenyl)alanine in free acid form. The above procedures are illustrated in greater detail hereinafter and in my copending application Ser. No. 24,014, filed Mar. 30, 1970.

The compounds described herein can exist in anhydrous form as well as in solvated, including hydrated, forms. In general, the solvated forms are equivalent to the anhydrous or unsolvated form for the purposes of the invention.

The new process of the invention is useful as an intermediate step in the synthetic production of the naturally occurring amino acid and pharmacological agent, 3-(3,4-dihydroxyphenyl)-L-alanine, otherwise known as L-DOPA. For example, the 3-(3,4-dimethoxyphenyl)-L-alanine produced according to the process of the invention is converted by heating with concentrated hydrobromic acid or other ether cleavage agent, and adjustment of the pH, to 3-(3,4-dihydroxyphenyl)-L-alanine.

The invention is illustrated by the following examples.

EXAMPLE 1

A suspension of 267 g., calculated as anhydrous form, of N-acetyl-3-(3,4-dimethoxyphenyl)alanine in 1,500 ml. of deionized water is adjusted to pH 7.3 with concentrated aqueous ammonia. With continuous stirring, the resulting solution is treated with 10 ml. of 0.1 M cobaltous chloride, 50 ml. of 1 percent formaldehyde, and 12 g. of *Aspergillus oryzae* enzymes. A suitable preparation of *Aspergillus oryzae* enzymes is the product known as Taka-Diastase, produced by *Aspergillus oryzae* grown on wheat bran, or an enzymatically equivalent product. Taka-Diastase is a mixed enzyme including an amylase and an acylase. The purified acylase fraction is sometimes also known as Taka-acylase; Journal of Biochemistry, 48, 603–616 (1960). An equivalent amount of the purified acylase fraction can be used in place of a mixed enzyme in the procedure of this example. The solution is warmed to 37° C., diluted with water to 2.5 liters, readjusted with aqueous ammonia or with acetic acid to pH 7.3, and incubated at 37° C. for a total of 4 days. After the first 5 hours, the pH is readjusted to 7.3–7.35. After the 4-day incubation period, the mixture is chilled to 10° C. and filtered. The insoluble product is washed with 150 ml. of cold water, with 150 ml. of isopropyl alcohol, with 200 ml. of 50 percent isopropyl alcohol-ether, and then with dry ether. The product is dried in vacuo. It is 3-(3,4-dimethoxyphenyl)-L-alanine; m.p. 265°–268° C.; $[\alpha]^{25}_D = -4.3°$ ($c = 5$ percent in 1.0 N hydrochloric acid).

The product obtained, as described above, can be converted to 3-(3,4-dihydroxyphenyl)-L-alanine by the following procedure. A mixture of 101 g. of 3-(3,4-dimethoxyphenyl)-L-alanine and 500 ml. of 48 percent hydrobromic acid is heated at reflux for 3 hours and then distilled almost to dryness under reduced pressure. The residual gummy product is stirred with 500 ml. of a solution prepared by dissolving 100 g. of anhydrous sodium acetate in a mixture of 900 ml. of methanol and 100 ml. of water. Stirring is continued until the gum is gone and a solid precipitate remains. The precipitated product is collected on a filter and washed well with water, with isopropyl alcohol, and with dry ether. This product is dissolved in 300 ml. of 0.5 M hydrochloric acid and the solution is stirred with acid-washed charcoal, filtered, and adjusted to pH 4.5 with saturated aqueous sodium acetate. The insoluble product is collected on a filter, washed with 50 ml. of water, 150 ml. of isopropyl alcohol, and 300 ml. of dry either. It is 3-(3,4-dihydroxyphenyl)-L-alanine m.p. 284°–286° C.; $[\alpha]^{25}_D = -11.25°$ ($c = 5$ percent in 1.0 N hydrochloric acid).

EXAMPLE 2

A somewhat improved yield is obtained by the following procedure. A suspension of 468 g., calculated as anhydrous form, of N-acetyl-3-(3,4-dimethoxyphenyl)alanine in 1500 ml. of deionized water, is adjusted to pH 7.5 with concentrated aqueous ammonia. With continuous stirring, the resulting solution is treated with 10 ml. of 0.1 M cobaltous chloride, 100 ml. of 1 percent formaldehyde, and 22 g. of *Aspergillus oryzae* enzymes. A suitable preparation of *Aspergillus oryzae* enzymes is the product known as Taka-Diastase, produced by *Aspergillus oryzae* grown on wheat bran, or an enzymatically equivalent product. The solution is warmed to 37° C., diluted with water to 2.5 liters, readjusted with aqueous ammonia or with acetic acid to pH 7.5, and incubated at 37° C. for a total of 4 days. After the first 5 hours, the pH is readjusted to 7.5. After the 4-day incubation period, the mixture is chilled to 10° c. and filtered. The insoluble product is washed with 150 ml. of cold water, with 150 ml. of isopropyl alcohol, with 200 ml. of 50 percent isopropyl alcohol-ether, and then with dry ether. The product is dried in vacuo. It is 3-(3,4-dimethoxyphenyl)-L-alanine; m.p. 265°–268° C.; $[\alpha]^{25}_D = -4.3°$ ($c = 5$ percent in 1.0 N hydrochloric acid).

Similar results are obtained by carrying out the incubation at 45° C. rather than 37° C.

STARTING MATERIALS

With stirring, 190 g. of sodium methoxide is dissolved in a solution of 940 g. of 3,4-dimethoxybenzylmalonic acid, dimethyl ester, in 2.5 liters of methanol. The solution is chilled to −15° C. and treated with a stream of methyl nitrite while the temperature is maintained at −20° to −15° C. The methyl nitrite used in this procedure is produced as follows. Over a period of one hour, 475 ml. of cold aqueous sulfuric acid (prepared by pouring one volume of concentrated sulfuric acid into two volumes of water) is added to a methyl nitrite generator containing 287 g. of sodium nitrite, 185 ml. of methanol, and 177 ml. of water. The methyl nitrite is passed through a calcium sulfate drying tower into the reaction mixture as described above. When the addition of methyl nitrite is complete, the temperature of the reaction mixture is allowed to rise to 0° C. over a period of 2 ½ hours. The solution is neutralized with concentrated sulfuric acid while maintaining the temperature at 0°–5° C. and is then concentrated to a volume of 1.5 liters, diluted with 3 liters of water, and chilled. The insoluble product is collected on a filter, washed with water, and dried under reduced pressure. It is 3,4-dimethoxyphenylpyruvic acid, methyl ester, oxime; m.p. 111.5°–113° C.

A mixture of 50.6 g. of 3,4-dimethoxyphenylpyruvic acid, methyl ester, oxime, 400 ml. of acetic acid, 42 ml. of acetic anhydride, and 1.0 g. of 20 percent palladium on charcoal catalyst is shaken with hydrogen at room temperature and at an initial pressure of 50 pounds per square inch until the theoretical amount of hydrogen (two molecular equivalents) has been absorbed. The catalyst is removed by filtration and the filtrate is evaporated under reduced pressure to give a residue of N-acetyl-3-(3,4-dimethoxyphenyl)alanine, methyl ester. This product is dissolved in 200 ml. of 50 percent aqueous methanol. The solution is heated to 60° C. and 20 percent aqueous sodium hydroxide is added slowly with stirring to bring the pH to and maintain it at 10–12. Preferably the pH is stabilized at 10.5–11 whereupon the solution is stirred an additional 20 minutes and then evaporated at reduced pressure to remove most of the methanol. The volume is adjusted to 225 ml. by dilution with water. The solution, containing N-acetyl-3-(3,4-dimethoxyphenyl)alanine, sodium salt, is acidified with concentrated hydrochloric acid to pH 1 and cooled. The insoluble product is collected on a filter, washed with cold water, and dried. This product is suitable for use without further purification. If further purification is desired, it is crystallized from water. The product is N-acetyl-3-(3,4-dimethoxyphenyl)alanine (in the form of a monohydrate); m.p. 107°–109° C.

I claim:

1. Process for the production of 3-(3,4-dimethoxyphenyl)-L-alanine which comprises subjecting racemic N-acetyl-3-(3,4-dimethoxyphenyl)alanine at a concentration of substantially 10 percent or greater to the enzymatic action of an acylase from *Aspergillus oryzae* in an aqueous medium, containing cobaltous ions in a concentration of $10^{-4}$ to $5 \times 10^{-2}$ M and substantially free of other metallic ions, at a pH of 6.0 to 9.0 using ammonia as base; allowing the enzymatic reaction to proceed until it is substantially complete; and collecting said 3-(3,4-dimethoxyphenyl)-L-alanine as an insoluble precipitate.

* * * * *